METHOD AND APPARATUS FOR STORING LOW-BOILING LIQUIDS
Filed Dec. 13, 1965
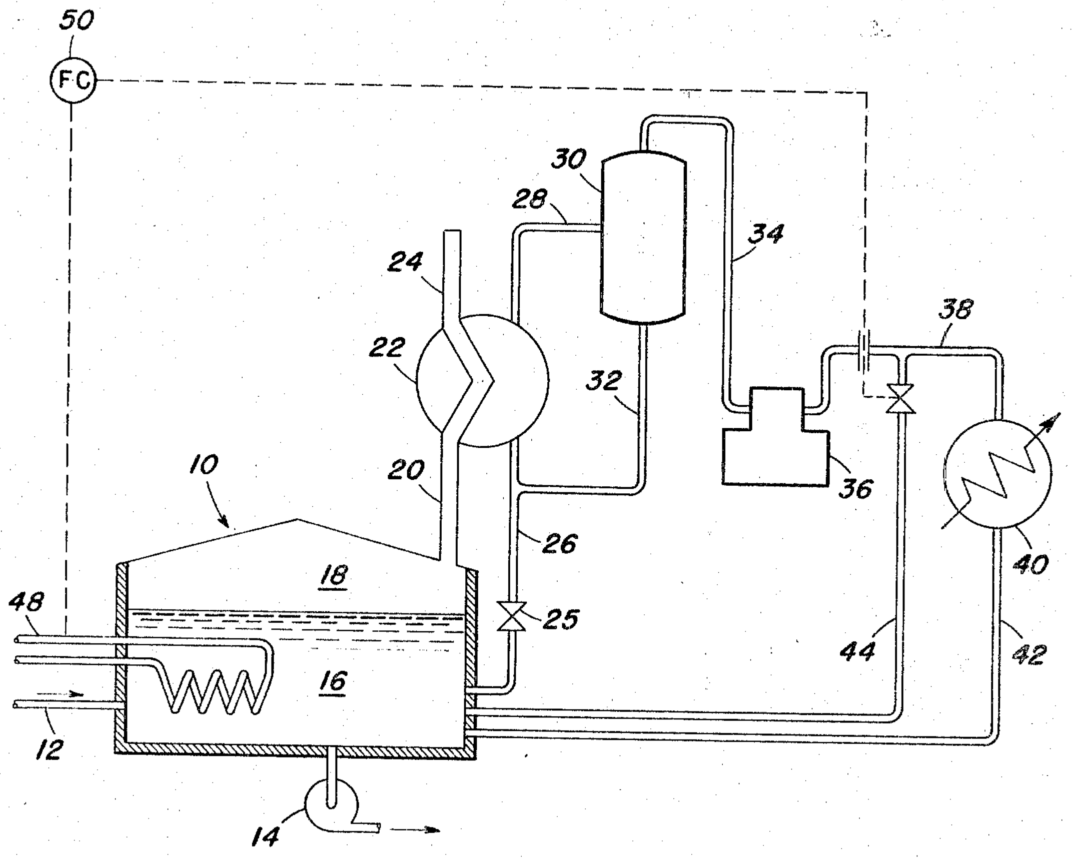
INVENTOR
Theodore R. Roszkowski
BY Mann & Jangarathis
ATTORNEYS United States Patent Office 3,318,104
Patented May 9, 1967

3,318,104

METHOD AND APPARATUS FOR STORING LOW-BOILING LIQUIDS

Theodore R. Roszkowski, 50 Egerton Gardens, London, England

Filed Dec. 13, 1965, Ser. No. 513,337
10 Claims. (Cl. 62—45)

This invention relates to an improved method and apparatus for storing low-boiling point liquids and, more particularly, the invention is concerned with the storage at atmospheric pressures of liquids which boil at relatively low temperatures, i.e. below ambient temperatures. The invention has application to the storage of liquid ammonia, lower molecular weight hydrocarbons and similar materials.

The need for safe and economic large volume storage facilities for low-boiling liquids is great and is growing every year. For example, liquid ammonia is produced in large scale plants operating continuously throughout the year. However, one of the principal end uses for ammonia is in the fertilizer industry, where demand is highly seasonal. Thus, ammonia produced during the off-season must be stored during the interim.

Highly volatile liquids are generally stored in three types of containers of progressively larger volume. Firstly, small volume, thick-walled vessels having a high length-to-diameter ratio have been employed. These vessels, commonly called "bullets," are designed to resist internal pressures corresponding to the vapor pressures of the stored liquid at a maximum ambient temperature. Secondly, moderate volume spherical vessels have been employed, wherein highly volatile liquids are stored at temperatures less than ambient and the corresponding vapor pressures. These vessels are designed to withstand internal pressures corresponding to the vapor pressures, and refrigeration facilities are provided to maintain the lower temperatures. Lastly, large volume, heavily insulated vertical, cylindrical tanks have been employed to store highly volatile liquids at substantially atmospheric pressure and the corresponding atmospheric boiling point, which is considerably lower than ambient temperature. Refrigeration facilities are provided to maintain the required low temperatures. These vessels are usually designed for hydrostatic heads and minimum differential pressures between the vapor space and the atmosphere. This method is a more recent development than the two methods mentioned above, and is commonly called "low-pressure" storage. The present invention relates to the latter method of storage.

Problems associated with the proper design of low pressure storage facilities for highly volatile liquids are both numerous and difficult. These problems include foundation design, thermal stresses in the metals used in construction, thermal insulation and proper control of the differential pressure between the vapor space and the atmosphere, so as to have minimum loss of the stored highly volatile liquid and, at the same time, minimum inspiration of air. One solution to these problems is set forth in U.S. Patent No. 2,938,360, but even in this patent it is admitted that there is some loss of the highly volatile liquid and some inspiration of air. According to this patent, a refrigeration system is used to extract vapor formed by the influx of heat into the storage vessel, compress and liquify the vapor and return it to the storage vessel. When the pressure of the gas within the tank is higher than the ambient pressure, gas flows through a pipe line into a separate condensing section and then into a saturator where it is absorbed into liquid pumped from the tank and returned thereto. Of course, the scrubbed gas, admitted to the atmosphere, is lost. If the pressure within the tank is less than ambient pressure air is drawn through the saturator and contacted with liquid pumped from the tank. This air, which has picked up some vapor in the saturator, is then drawn into the tank thus equalizing the pressure therein with that of the atmosphere.

As can be seen, with this system vapor will be lost if more vapor (per unit time) than can be completely scrubbed is passed through the saturator. Conversely, air will be inspired if more is drawn in (per unit time) than can be saturated.

It is thus a general object of the present invention to provide an improved method and apparatus for the storage of highly volatile liquids in low pressure storage vessels which overcomes the foregoing defects of prior art devices and methods.

Another object of the present invention is to provide a low pressure liquid storage facility which instantaneously adjusts to changes in either internal or external pressure, without loss of liquid vapor and without inspiration of outside air.

Still another object of the invention is to provide an improved low pressure liquid storage facility for highly volatile liquids which is simple and economic to operate, entirely safe, and which is immediately responsive to pressure changes caused by the withdrawal or addition of liquid from the storage facility, or changes in atmospheric pressure.

These and other objects and advantages of the invention will become clear from the following description of a specific embodiment thereof, and the novel features will be particularly pointed out in connection with the appended claims.

Prior to discussing the storage facility according to the present invention in detail, it will be helpful to the understanding thereof to consider the following pertinent factors which effect all such facilities:

(1) Regardless of the thickness of insulation on the storage vessel, there is generally a finite leak of heat into any low pressure, highly volatile liquid storage facility. This heat, of course, produces vapor. The produced vapor will increase the pressure in the vapor space unless it is either liquified or vented.

(2) The highly volatile liquid entering such a low pressure storage vessel is generally pumped in as a two-phase mixture or a super heated liquid which flashes. This flashed vapor or vapor-phase product will increase pressure in the vapor space unless it is liquified or vented.

(3) Liquid entering a storage vessel will, obviously enough, displace vapor volume. The vapor occupying the displaced volume will increase vapor space pressure unless it is either liquified or vented.

(4) Withdrawal of liquid from the storage vessel will create additional vapor space which, also obviously, will decrease vapor space pressure unless additional liquid is vaporized or air is inspired.

(5) If the vapor space pressure in the low pressure liquid storage facility is instantaneously adjusted to atmospheric, then an increase in atmospheric pressure will decrease vapor volume, causing air to inspire unless additional liquid is vaporized.

(6) Similarly, increasing the atmospheric pressure will increase the boiling point of the liquid. Vapor will condense in the sub-cooled liquid, inspiring air, unless external heat is applied to the liquid.

(7) If the vapor space pressure in such a vessel is adjusted instantaneously to atmospheric, then decreasing atmospheric pressure will increase vapor volume, causing venting of vapor unless it is liquified.

(8) Similarly, decreasing atmospheric pressure will decrease the boiling point of the liquid, causing flashing and venting of flashed vapors, unless they are liquified.

In essence, the present invention comprises a low pressure liquid storage facility for highly volatile liquids which has an unobstructed passage from the vapor space to the atmosphere, via a reflux condenser. Venting is prevented by supplying a refrigeration system, including a knock-out drum, a compressor and a condenser to reflux escaping vapors. According to the invention, the stored highly volatile liquid is employed as the refrigerant. The refrigerant liquid enters the cold side of the reflux condenser at reduced pressure, providing a heat sink at low temperature for the heat removed from the condensing, venting vapors on the hot side. Condensed refrigerant is returned to the storage tank. Inspiration of air is prevented by supplying a heat source to vaporize the highly volatile liquid. As a heat source, separate means such as an electrical coil or any suitably hot fluid may be provided, or alternatively, condensing vapor from the compressor or warm liquid from the refrigeration condenser may be employed. In the latter case, a separate heating coil need not be used.

A better understanding of the invention will be gained by referring to the accompanying drawing, which is a simplified schematic flow sheet or flow diagram illustrating an embodiment of the invention.

For purposes of simplicity and ease of understanding, valving, couplings and other conventional expedients are not included in the drawing.

With reference to the drawing, a conventional low pressure liquid storage facility, indicated generally at 10, is provided with conventional inlet means 12 and outlet means 14. Liquid 16 within the storage vessel vaporizes with heat influx filling the vapor space 18 with vaporized liquid. An unobstructed passage 20 communicates with vapor space 18, and connects the vapor space 18 with the atmosphere via reflux condenser 22 and vent pipe 24.

Refrigeration for reflux condenser 22 is supplied by a refrigeration system consisting of a knock-out drum 30, a compressor 36 and a condenser 40. Liquid 16 from the storage vessel 10 is passed through expansion valve 25 where it is cooled and partially vaporized, and into line 26 at reduced pressure, and then pases through reflux condenser 22, causing vapors in the passage 20 to condense and fall back into the storage vessel. Vapors and any entrained, heated liquid pass out of reflux condenser 22 in line 28 and are separated in knock-out drum 30. Liquid flows through return line 32 to line 26. Vapors pass in line 34 into compressor 36, and thence via line 38 into condenser 40. The condensed vapors at the discharge head of the compressor are at sufficient pressure to overcome the hydrostatic head in storage vessel 10 and the liquid returns thereinto via line 42.

The refrigeration system described hereinabove takes care of all instances wherein more vapor than can be contained in vapor space 18 is generated and the vapor tries to escape through passage 20. Under the opposite set of circumstances, wherein vapor generated in space 18 does not fill that space at the prevailing pressure and air tends to be inspired through vent pipe 24, heater 48 is required.

As shown, heater 48 is connected to an independent fluid heating source, or may be interpreted as having an electric heating element therein. Under certain circumstances, liquid returning in line 42 may be considered as the heating medium, or, returning warm vapor in line 38 may be used as the heating medium. In the latter case, the compressed vapors are returned to tank 10 as required via line 44. In either event, the object of the heater is to create vapor in vapor space 18 such that air is prevented from inspiring into the interior of the vessel.

Thus, the refrigeration system takes care of the combination of factors, 1, 2, 3, 7 and 8 listed above. It is to be noted that the compressor 36 will function most satisfactorily at a particular set of design conditions. Therefore, to hold compressor 36 loadings at design conditions the heater 48 should be sized for factors 4, 5 and 6 noted above, and the design load of compressor 36. A flow controller 50 is provided to adjust the load on heater 48 so that the compressor 36 load matches design at intermediate conditions.

When factors 1, 2, 3, 7 and 8 are prevalent, the heater 48 is inoperative and the refrigeration system condenses and refluxes all vapors. When factors 4, 5 and 6 prevail, on the other hand, then the heater 48 operates at design capacity, producing sufficient vapor to prevent air inspiration and to satisfy the compressor load. At intermediate conditions of factors 1 through 8, the heater 48 load adjusts to a vapor production rate equal to the rate corresponding to the design condition of the compressor 36, less than algebraic sum of contributions from factors 1 through 8.

Alternatively, the heater 48 may be sized for a somewhat smaller fixed load, and heat balance maintained and control effected by regulation of cooling water to the condenser 40. In effect, the reduction of the heater load would be exactly equivalent to the reduction in the condenser load in maintaining heat balance. As should be obvious, the flashing of refrigerant return to the storage vessel reduces the heater load and/or increases the load on the refrigeration system.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. Apparatus for storage at atmospheric pressure of liquids boiling below normal atmospheric temperatures that comprises:

a storage tank having a vapor space therein;

unrestricted passage means communicating with said vapor space and the atmosphere;

refrigeration means in indirect heat exchange relation with said passage means and capable of condensing vapors from said vapor space within said passage means;

heating means within said tank and capable of vaporizing liquid therein; and control means operable to maintain vapor within said vapor space and prevent loss of vapor to the atmosphere and inspiration of air, said control means controlling said heating means to maintain a load on said refrigeration means.

2. The apparatus as claimed in claim 1, and additionally comprising means for supplying and returning liquid from said tank to said refrigeration means for use as refrigerant therein.

3. The apparatus as claimed in claim 2, and additionally comprising second heat exchange means capable of maintaining liquid within said tank at its boiling point.

4. The apparatus as claimed in claim 1, wherein said heating means is located within said tank below the liquid and heats the liquid indirectly.

5. The apparatus as claimed in claim 2, wherein said refrigeration means include a compressor and a condenser, and said heating means comprise means for returning compressed vapor to said tank.

6. Method of storing at atmospheric pressure liquids having a boiling point below normal atmospheric temperatures that comprises:

establishing and maintaining a body of liquid within a storage tank at the boiling point thereof;

providing a space for vapor above said body of liquid;

maintaining atmospheric pressure within said tank by providing free communication between said vapor space and the atmosphere through a passage;

condensing vapors passing through said passage from said vapor space by refrigerating said passage, whereby loss of liquid vapor to the atmosphere is prevented;

heating liquid within said tank to maintain said vapor space full of vapor and prevent air from being inspired into said vapor space;

said condensing and heating steps being responsive to atmospheric conditions.

7. The method as claimed in claim 6, wherein liquid from said tank is employed as a refrigerant for said condensing step.

8. The method as claimed in claim 6, wherein said heating is accomplished by return of refrigerant vapor to said tank.

9. The method as claimed in claim 7, wherein liquid from said tank is vaporized during said condensing step, and further comprising compressing and condensing the vapor thus produced, and returning the condensate to said storage tank.

10. The method as claimed in claim 9, wherein said compressed vapor is used as required in said heating step as a direct heat exchange medium.

References Cited by the Examiner

UNITED STATES PATENTS

| | | | |
|---|---|---|---|
| 2,059,942 | 11/1936 | Gibson | 62—54 |
| 2,784,560 | 3/1957 | Johnson | 62—54 |
| 2,842,942 | 7/1958 | Johnston et al. | 62—50 |
| 2,944,405 | 7/1960 | Basore et al. | 62—54 |
| 3,108,447 | 10/1963 | Maher et al. | 62—54 |
| 3,132,489 | 5/1964 | Maher et al. | 62—54 |
| 3,150,495 | 9/1964 | Reed | 62—54 |
| 3,195,316 | 7/1965 | Maher et al. | 62—54 |

LLOYD L. KING, *Primary Examiner.*